Aug. 23, 1949.　　　　　　G. E. DATH　　　　　　2,479,672
FRICTION SHOCK ABSORBER
Filed March 9, 1944　　　　　　　　　　　　　　2 Sheets-Sheet 1
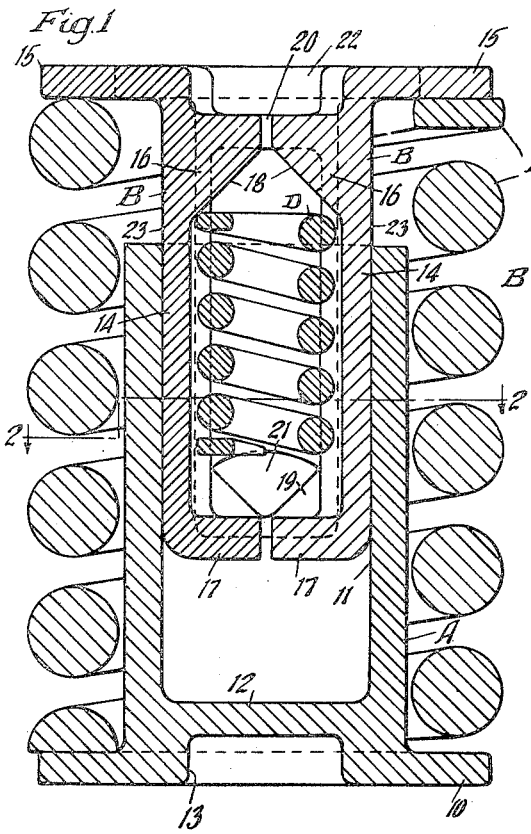
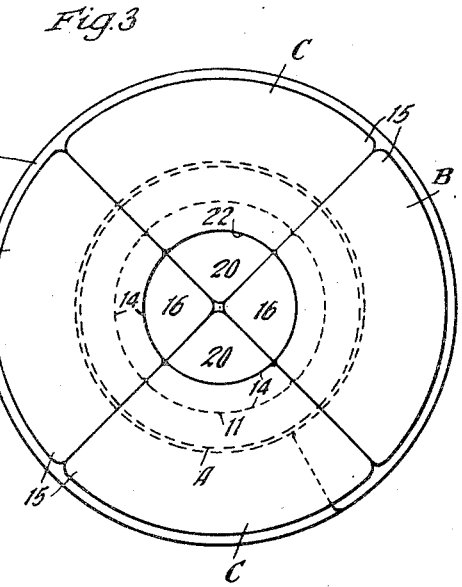
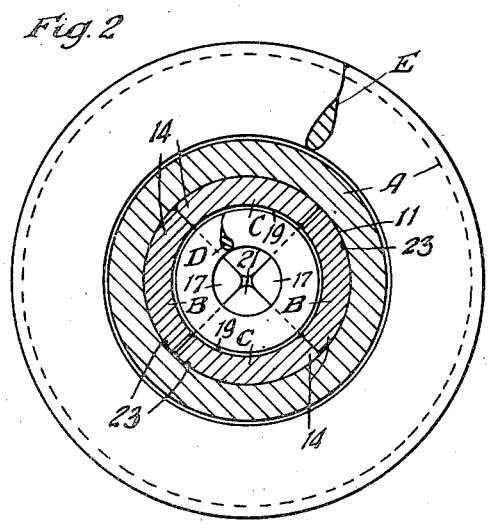
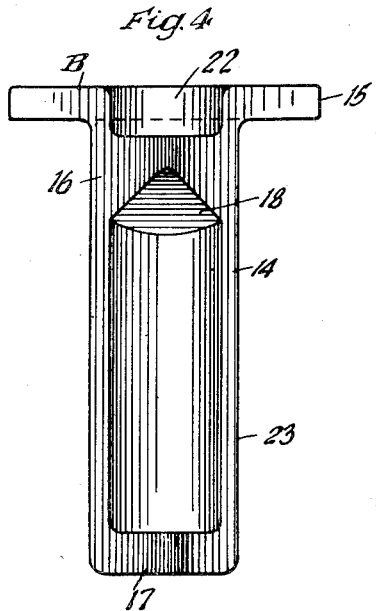
Inventor
George E. Dath
By Henry Fuchs.
Atty.

Aug. 23, 1949.    G. E. DATH    2,479,672
FRICTION SHOCK ABSORBER
Filed March 9, 1944    2 Sheets-Sheet 2
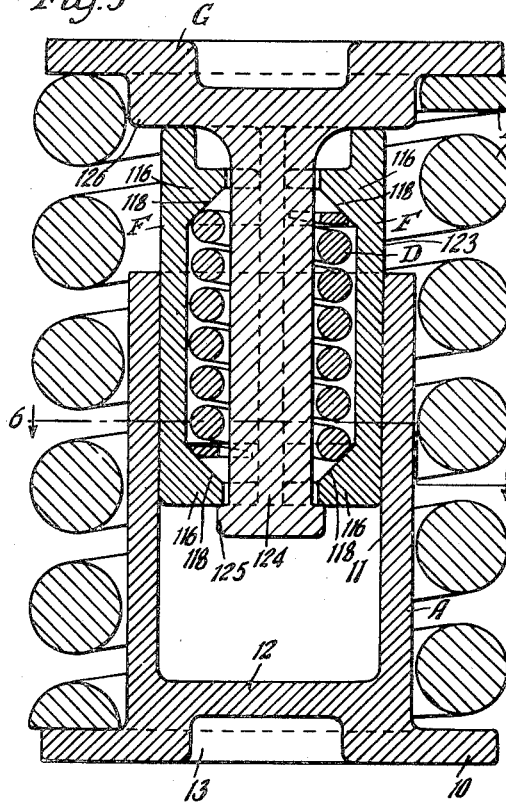
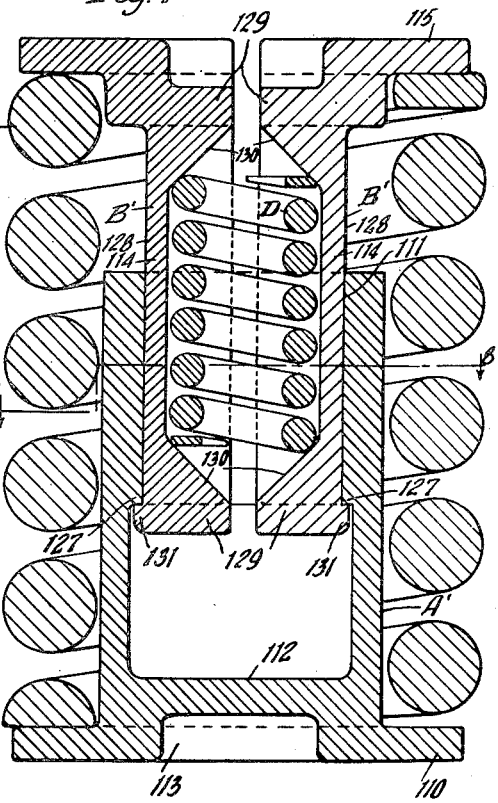
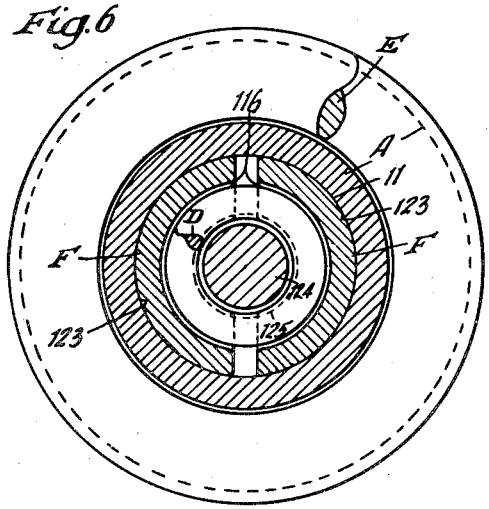
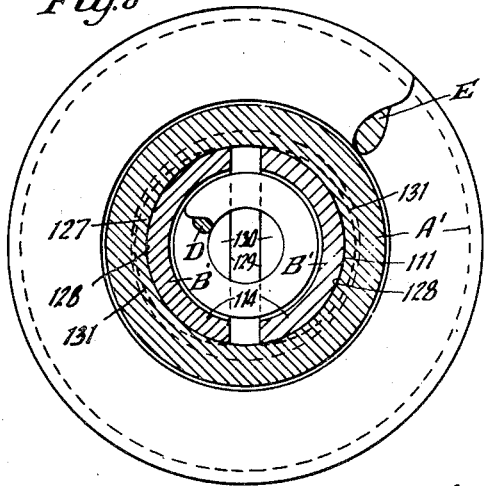
Inventor
George E. Dath
By Henry Fuchs
Atty.

Patented Aug. 23, 1949

2,479,672

UNITED STATES PATENT OFFICE 2,479,672

FRICTION SHOCK ABSORBER

George E. Dath, Chicago, Ill., assignor to W. H. Miner, Inc., Chicago, Ill., a corporation of Delaware Application March 9, 1944, Serial No. 525,723

4 Claims. (Cl. 267—9)

This invention relates to improvements in friction shock absorbers, especially adapted for snubbing the action of truck springs of railway cars.

One object of the invention is to provide a friction shock absorber of the character indicated comprising a friction casing; a plurality of friction shoes slidable within the casing; a spring under compression holding the shoes spread apart and yieldingly forcing the same against the interior walls of the casing; and a spring surrounding the casing and shoes and opposing relative lengthwise movement of the shoes and casing, wherein the spring which holds the shoes spread apart is in the form of a coil having direct wedging engagement with the shoes.

Other objects of the invention will more clearly appear from the description and claims hereinafter following.

In the drawings forming a part of this specification, Figure 1 is a central longitudinal vertical sectional view of my improved shock absorber. Figure 2 is a transverse horizontal sectional view, corresponding substantially to the line 2—2 of Figure 1. Figure 3 is a top plan view of Figure 1. Figure 4 is an elevational view of one of the friction shoes of my improved mechanism, the shoe illustrated being at the left hand side of Figure 1, looking from right to left in said figure. Figure 5 is a view, similar to Figure 1, illustrating another embodiment of the invention. Figure 6 is a transverse horizontal sectional view, corresponding substantially to the line 6—6 of Figure 5. Figure 7 is a view, similar to Figure 1, illustrating still another embodiment of the invention. Figure 8 is a transverse horizontal sectional view, corresponding substantially to the line 8—8 of Figure 7.

Referring first to the embodiment of the invention illustrated in Figures 1 to 4 inclusive, my improved shock absorber comprises broadly a friction casing A; two friction shoes B—B; two friction shoes C—C; an inner coil spring D for holding the shoes spread apart; and a heavy outer spring E surrounding the casing and shoes and opposing relative lengthwise movement thereof.

The casing A is in the form of a cylindrical, tubular member having a laterally outwardly projecting base flange 10 at its lower end forming, in effect, a follower member integral with the casing. The casing is open at the top and is provided with an interior, cylindrical friction surface 11 at said open end. The bottom end of the casing is closed by a transverse wall 12, which is provided with a downwardly facing, central seat 13 adapted to receive the usual spring centering projection of the lower spring follower plate of the spring cluster of a railway car truck.

The friction shoes are four in number and together form a friction clutch which is telescoped within the casing A. The four shoes B—B and C—C are of similar design, except as hereinafter pointed out. Each shoe comprises a relatively heavy, transversly curved, platelike section 14 having a laterally outwardly projecting, horizontal flange 15 at its upper end of sector-shape in plan view. Each shoe presents a longitudinally extending, transversely curved friction surface 23 on the outer side of the plate section 14 thereof. The assembled shoes B—B and C—C form, in effect, a sectional cylinder, which is vertically split into four similar sections. Each shoe B has a laterally projecting, inward enlargement adjacent the upper end thereof, as indicated at 16, and a horizontally disposed, inturned flange 17 at the lower end thereof. On the inner side thereof, the enlargement 16 of each shoe B is provided with an inner, downwardly facing wedge face 18 for a purpose hereinafter described. Each shoe C has a laterally projecting, inward enlargement 19 at the lower end thereof, similar to the enlargement 16 at the upper end of the shoe B and has an inwardly projecting, horizontal flange 20 adjacent the upper end thereof. On the inner side thereof, the enlargement 19 of the shoe C is provided with an inner, upwardly facing wedge face 21 for a purpose hereinafter described. The shoes B—B and C—C are alternated, the shoes B and B being diametrically opposite each other and the shoes C—C also diametrically opposite. The upper surfaces of the flanges 20—20 of the shoes C—C are in horizontal alignment with the upper surfaces of the enlargements 16—16 of the shoes B—B, thereby providing a central seat 22 at the upper end of the clutch formed by the four shoes, which seat opens upwardly and is adapted to receive the usual centering projection of the upper spring follower plate of the spring cluster of a railway car truck. The bottom surfaces of the flanges 17—17 of the shoes B—B are in horizontal alignment with the bottom surfaces of the enlargements 19—19 of the shoes C—C, as clearly shown in Figure 1.

The inner spring D is in the form of a single, relatively light coil disposed between the shoes B—B and C—C, bearing at its upper end on the wedge faces 18—18 of the shoes B—B and bearing at its lower end on the wedge faces 21—21 of the shoes C—C. The spring D is under predetermined compression and, by its direct engagement with the wedge faces of the shoes, spreads the latter apart to place the friction surfaces 23 thereof in tight frictional contact with the interior friction surfaces 11 of the casing A.

The outer spring E comprises a relatively heavy coil surrounding the casing A and the shoes B—B and C—C and has its top and bottom ends bearing respectively on the flanges 15—15—15—15 of the shoes and the flange 10 of the casing A.

My improved shock absorber is substituted for one or more of the coil spring units of a cluster of truck springs, the same being interposed between the top and bottom spring follower plates of said cluster.

The operation of the improved shock absorber illustrated in Figures 1 to 4 inclusive is as follows: Upon the spring cluster of the truck being compressed between the spring follower plates of the cluster, the clutch comprising the shoes B—B and C—C, and the friction casing A are moved in lengthwise direction toward each other, thereby compressing the spring E and sliding the clutch inwardly along the friction surface of the casing, thus producing the required amount of frictional resistance to snub or dampen the action of the coils of the truck spring cluster. As will be evident, the frictional resistance provided is substantially constant as the spring D which wedges the shoes apart is under a predetermined compression, which remains constant throughout the operation of the shock absorber.

During recoil of the truck springs, expansion of the spring E returns all of the parts to the normal position shown in Figure 1. As will be evident, the frictional resistance provided between the shoes and casing being constant during all phases of the operation of my improved friction shock absorber, the same amount of frictional resistance to snub the action of the truck springs is provided during both compression and recoil of the truck springs.

Referring next to the embodiment of the invention illustrated in Figures 5 and 6, the construction is similar to that shown in Figures 1 to 4 inclusive, with the exception that the friction shoes are two in number, instead of four, and are carried by an upper follower, instead of having follower flanges at their upper ends.

My improved shock absorber, as illustrated in Figures 5 and 6, comprises broadly a friction casing in all respects identical with the friction casing A hereinbefore described and also indicated by A; a pair of friction shoes F—F; an upper follower G; an inner spring in all respects similar to the inner spring D hereinbefore described and also indicated by D; and an outer spring in all respects similar to the spring E hereinbefore described and also indicated by E.

The casing A shown in Figures 5 and 6 is in all respects similar to the casing A hereinbefore described and the parts thereof are indicated by the same reference characters as employed in Figures 1 to 4 inclusive.

The shoes F are of like design, each shoe being in the form of a relatively heavy, transversely curved plate having lateral inward enlargements 116—116 at the top and bottom ends thereof, presenting wedge faces 118—118 on their inner sides, the wedge faces at opposite ends of each shoe facing each other. On the outer side, each shoe F presents a longitudinally extending, transversely curved friction surface 123 which cooperates with the interior friction surface 11 of the casing A.

The follower G, which is in the form of a substantially flat disc, has a depending, cylindrical post 124 thereon, which is provided with a head 125 at its lower end. The post 124 extends from a central boss 126 formed on the follower G. The post 124 extends between the friction shoes F—F and serves to anchor the same to the follower G, the shoes being interposed between the boss 126 of the follower and the head 125 of the post and bearing at their top and bottom ends on said boss and head.

The spring D, which is under predetermined constant compression, surrounds the post 124 and has wedging engagement with the wedge faces 118—118 at opposite ends of the shoes to spread the same apart.

The spring E surrounds the casing A and the shoes F—F and has its opposite ends bearing on the follower G and the flange 10 of the casing.

The operation of my improved shock absorber shown in Figures 5 and 6 is identical with the operation of the shock absorber described in connection with Figures 1 to 4 inclusive, and therefore needs no further detailed description.

Referring next to the embodiment of the invention illustrated in Figures 7 and 8, the structure is the same as that described in connection with Figures 1 to 4 inclusive, with the exception that the shoes are two in number, instead of four, each shoe has wedge faces at opposite ends, instead of at one end only, and that the shoes have shouldered engagement with the casing to limit relative lengthwise movement of the shoes and casing and hold the parts assembled.

My improved shock absorber as shown in Figures 7 and 8 comprises a casing A'; two friction shoes B'—B'; an inner spring in all respects similar to the spring D hereinbefore described and also indicated by D; and an outer spring in all respects similar to the outer spring E hereinbefore described and also indicated by E.

The casing A' is similar to the casing A hereinbefore described, except as hereinafter pointed out, having a base flange 110, a bottom wall 112, and a seat 113, corresponding to the flange 10, bottom wall 12, and seat 13 of the casing A. The interior friction surface of the casing A', which is indicated by 111, corresponds to the friction surface 11 of the casing A, but the casing A' is interiorly enlarged at the bottom portion thereof to provide an annular stop shoulder 127 at the inner end of the friction surface 111.

The friction shoes B'—B' are similar to the shoes B—B hereinbefore described, except as hereinafter pointed out. Each shoe B' has a plate section 114 of curved, transverse, cross section, provided with a longitudinally extending, transversely curved, friction surface 128 on the outer side thereof engaging the interior friction surface 111 of the casing. At the upper end, each shoe has a laterally projecting, semicircular flange 115 which serves the same purpose as the flanges 15 of the shoes B and C hereinbefore described. On the inner side, each shoe B' has lateral inward enlargements 129—129 at the upper and lower ends thereof which are provided with wedge faces 130—130. The wedge faces 130—130 face inwardly toward each other and cooperate with the opposite ends of the spring D.

The spring D is interposed between the shoes B'—B' and is under a predetermined compression, having wedging engagement with the wedge faces 130—130 at opposite ends of the shoes and pressing the same apart in the same manner as described in connection with the shoes shown in the embodiment of the invention illustrated in Figures 5 and 6. The shoes B' have laterally outwardly projecting, short flanges 131 at their lower ends in shouldered engagement with the stop shoulder 127 of the casing A' to limit outward movement of the shoes.

The spring E, which is identical with the spring E described in connection with the shock absorber illustrated in Figures 1 to 4 inclusive, surrounds the casing A' and shoes B'—B' and bears at its top and bottom ends on the flanges 115 of the shoes and the flange 110 of the casing A'.

The operation of the improved shock absorber illustrated in Figures 7 and 8 is identical with the operation of the shock absorber shown in Figures 1 to 4 inclusive, with the exception that, when the parts are restored to normal position by the spring E, outward movement of the shoes B'—B' is limited by the flanges 131—131 thereof engaging the shoulder 127 of the casing A'.

I claim:

1. In a friction shock absorber, the combination with a friction casing; of a friction unit slidingly telescoped within the casing, said unit comprising a plurality of lengthwise arranged shoes, each of said shoes having an inwardly facing wedge face thereon at one end thereof only, said shoes being arranged in sets with the wedge faces of one set at one end of said unit and the wedge faces of the other set at the opposite end of said unit; a lengthwise extending coil spring under compression embraced by said shoes and having wedging engagement at opposite ends directly with the wedge faces of said shoes to spread said shoes apart; and spring means yieldingly opposing relative lengthwise movement of said shoes inwardly of the casing.

2. In a friction shock absorber, the combination with a friction casing; of a friction unit slidingly telescoped within said casing, said unit including a friction shoe having an inwardly facing wedge face at one end of said unit only, said unit including a second shoe having an inwardly facing wedge face at the other end of said unit only; a coil spring embraced between said shoes, said spring extending lengthwise of said unit and being under predetermined initial compression, said spring having wedging engagement at opposite ends with the wedge faces of said shoes to spread said shoes apart; and spring means yieldingly opposing relative lengthwise movement of the casing and shoes toward each other.

3. In a friction shock absorber, the combination with a cylindrical friction casing having lengthwise extending, interior friction surfaces; of an annular series of friction shoes slidingly telescoped within the casing and having lengthwise extending friction surfaces in sliding engagement with the interior friction surfaces of the casing, each of said shoes having an inwardly facing wedge face at one end thereof only, the wedge faces of adjacent shoes being at respectively opposite ends thereof; a coil spring under predetermined initial compression embraced between said shoes, the opposite ends of said spring having direct wedging engagement with the wedge faces of said shoes to spread the same apart; and spring means yieldingly opposing relative lengthwise movement of said casing and shoes toward each other.

4. In a friction shock absorber, the combination with a cylindrical friction casing having a lengthwise extending, interior friction surface; of an annular series of friction shoes slidingly telescoped within the casing and having lengthwise extending friction surfaces in sliding engagement with the interior friction surface of the casing, each shoe having an inwardly facing wedge face at one end thereof only, the wedge faces of adjacent shoes being at opposite ends of said shoes, respectively; a coil spring under initial compression embraced between said shoes, the opposite ends of said spring having direct wedging engagement with the wedge faces of said shoes to spread the same apart; and spring means yieldingly opposing relative lengthwise movement of said casing and shoes toward each other.

GEORGE E. DATH.

REFERENCES CITED

The following references are of record in the file of this patent:

UNITED STATES PATENTS

| Number | Name | Date |
|---|---|---|
| 1,127,657 | McCormick | Feb. 9, 1915 |
| 1,862,766 | O'Connor | June 14, 1932 |
| 1,985,369 | Fuchs | Dec. 25, 1934 |
| 2,182,917 | Dentler | Dec. 12, 1939 |
| 2,216,231 | Dentler | Oct. 1, 1940 |
| 2,265,392 | Olander | Dec. 9, 1941 |
| 2,295,548 | Cottrell | Sept. 15, 1942 |